United States Patent [19]
Weinberg et al.

[11] Patent Number: 6,063,221
[45] Date of Patent: May 16, 2000

[54] METHOD FOR MAKING AND CONVERTING A CENTERFOLDED FILM

[75] Inventors: Alan S. Weinberg, Taylors; Blaine C. Childress, Inman, both of S.C.

[73] Assignee: Cryovac, Inc., Duncan, S.C.

[21] Appl. No.: 09/009,625

[22] Filed: Jan. 20, 1998

[51] Int. Cl.[7] .................................................. B29C 53/04
[52] U.S. Cl. ......................... 156/203; 156/218; 156/271
[58] Field of Search ................................. 156/200, 203, 156/217, 218, 226, 227, 229, 244.18, 259, 271, 461, 466; 264/146, 150, 159, 173.12, 173.16, 176.1, 177.17, 209.3, 285; 426/127, 415

[56] References Cited

U.S. PATENT DOCUMENTS

| | | | |
|---|---|---|---|
| 3,741,253 | 6/1973 | Brax et al. | 138/137 |
| 4,064,296 | 12/1977 | Bornstein et al. | 428/35 |
| 4,724,176 | 2/1988 | Sun | 428/35 |
| 4,863,768 | 9/1989 | Ishio et al. | 428/34.9 |
| 5,055,328 | 10/1991 | Evert et al. | 428/34.9 |

FOREIGN PATENT DOCUMENTS

WO 96/31397  10/1996  WIPO .

*Primary Examiner*—Michael W. Ball
*Assistant Examiner*—B. Musser
*Attorney, Agent, or Firm*—Mark B. Quatt

[57] ABSTRACT

A method includes the steps of providing a tubing having an inner annular layer comprising a crosslinked polymeric material, and an outer annular layer comprising a non-crosslinked polymeric material, or a material that is crosslinked to a lesser extent than the material of the inner layer; longitudinally slitting the tubing to form a folded film; and reverse centerfolding the folded film to provide a folded film having a lateral slit edge, and a lateral folded edge opposite said lateral slit edge, such that the inner annular layer becomes an outer layer, and the outer annular layer becomes an inner layer. A bag can be made from the reverse centerfolded film, and an article such as food can be packaged in the bag.

20 Claims, 4 Drawing Sheets

METHOD FOR MAKING AND CONVERTING A CENTERFOLDED FILM

FIELD OF THE INVENTION

This invention relates to a method for making a film for use in the packaging of products, especially food products such as meat; and to a method for making a bag from the film.

BACKGROUND OF THE INVENTION

Polymeric films, especially oriented, heat shrinkable films, have gained wide acceptance in the food industry for use in making bags for packaging food products. Typically, bags formed from such films are provided to food processors with one end open to form a bag mouth. After the product, e.g. a subprimal of fresh red meat, is inserted into the bag mouth, air is normally evacuated from the bag, the mouth of the bag is closed, e.g. by heat sealing, and heat is applied to initiate shrinkage of the bag about the enclosed product.

Commercially useful bags must satisfy many requirements imposed by both the bag producer and the bag user. The bag should survive physically intact the process of being filled with a product, evacuated, sealed, and heat shrunk. The bag should also be strong enough, i.e. abuse resistant, to survive the normal material handling involved in moving the bagged product along a distribution system.

The bag also must often serve as a barrier to the infusion of gas, especially oxygen, from the surrounding environment. Typically, the structure of the bag will include an effective barrier to the infusion of oxygen since oxygen is well known to cause spoilage of food products.

A variety of different films have been used to form bags suitable for use in the food industry. One such film is disclosed in U.S. Pat. No. 3,741,253 to Brax et al., incorporated by reference herein in its entirety. This film has an inner layer of a cross-linked ethylene/vinyl acetate polymer, a directly joined middle layer of a polymer of vinylidene chloride and a third layer directly joined to the middle layer.

The film discussed above, when used in product packaging operations, is subject to two distinct performance concerns.

The first concern results from the solubility of the outer layer of the film resulting from the exposure of the film to grease and heat. During product packaging operations the film may be exposed to grease, for example, resulting from mineral oil used in cleaning the packaging equipment and/or naturally occurring grease generated from the product being packaged. When grease contacts the outer layer of the film and the film is subsequently heated during the shrinking operation of the film around the product, the integrity of the outer layer of the film can be reduced due to solubility.

The second concern is the potential for imperfect sealing of the package due to the sticking of a portion of the bag's outermost layer to a seal bar used to close the bag with associated transfer of polymer to the seal bar. This is generally exacerbated by inadequate interlayer adhesion. Eventually, there can be sufficient build-up of material on the sealing bar to interfere with proper sealing.

One solution to the foregoing concerns is to cross-link the outer layer of the film. Cross-linking renders the material insoluble to grease, enhances the interply adhesion, and improves the cohesiveness and resistance to flow of the heated outer layer during sealing. However, in typical film production processes such as extrusion coating, exemplified in Brax et al. '253, the outer layer is not irradiated and therefore not crosslinked, and the innermost layer is irradiated and crosslinked.

Definitions

"Crosslinked" and the like are used herein to denote a process to increase the polymer molecular weight, as well as the resultant state of the material after such a treatment. The use of ionizing radiation for crosslinking polymeric films is disclosed in U.S. Pat. No. 4,064,296, to BORNSTEIN, et. al., which is hereby incorporated in its entirety, by reference thereto. In the irradiation process, the film is subjected to an energetic radiation treatment, such as corona discharge, plasma, flame, ultraviolet, X-ray, gamma ray, beta ray, and high energy electron treatment. Radiation dosages are referred to herein in terms of the kilogray (kGy). A suitable radiation dosage of high energy electrons is in the range of 1 to 250 kGy, more preferably about 40–140 kGy, and still more preferably, 80–120 kGy. Preferably, irradiation is carried out by an electron accelerator and the dosage level is determined by standard dosimetry methods. Other accelerators such as a Van de Graaff or resonating transformer may be used. Crosslinking via irradiation is not limited to ionizing radiation as other energetic methods such as ultraviolet radiation may be used. The most preferred amount of radiation is dependent upon the film and its end use. Crosslinking can also be effected by chemical means.

"Non-crosslinked" and the like refers to materials that have not been crosslinked by exposure to an energetic radiation treatment, or chemical treatment, of the kind disclosed herein.

"Film" herein means a film, laminate, sheet, web, or the like which can be used to make a bag, and/or package an article.

"Centerfolded film" and the like is used herein to denote the process and condition of an annular film that has been longitudinally slit, resulting in two individual webs in face to face, congruent alignment, with the fold forming one of the lateral sides of the film, and the web edges forming the other lateral side of the film.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. Oriented films in accordance with the invention are characterized by a free shrink of at least 5% at 180° F., in either the longitudinal direction, the transverse direction, or both the longitudinal and transverse directions, as determined by ASTM D 2732.

SUMMARY OF THE INVENTION

In one aspect of the present invention, a method comprises the steps of providing a tubing having an inner annular layer comprising a crosslinked polymeric material, and an outer annular layer comprising a non-crosslinked polymeric material; longitudinally slitting the tubing to form a folded film; and reverse centerfolding the folded film to provide a folded film having a lateral slit edge, and a lateral folded edge opposite said lateral slit edge, such that the inner annular layer becomes an outer layer, and the outer annular layer becomes an inner layer.

In a second aspect, a method comprises the steps of providing a tubing having an inner annular layer comprising a crosslinked polymeric material, and an outer annular layer comprising a polymeric material crosslinked to a lesser extent than the polymeric material of the inner annular layer; longitudinally slitting the tubing to form a folded film; and reverse centerfolding the folded film to provide a folded film having a lateral slit edge, and a lateral folded edge opposite said lateral slit edge, such that the inner annular layer becomes an outer layer, and the outer annular layer becomes an inner layer.

BRIEF DESCRIPTION OF THE DRAWINGS

The invention may be further understood by reference to the following drawings, in which.

DETAILED DESCRIPTION

Figure 1:
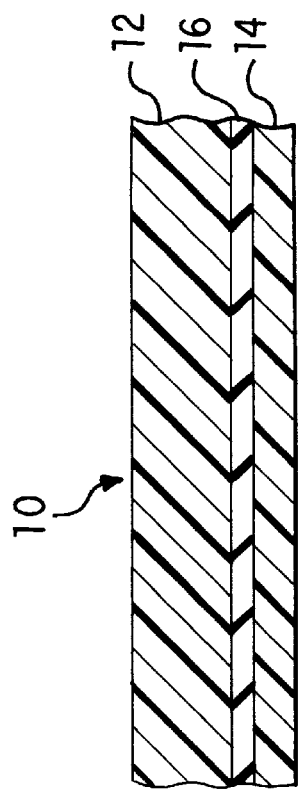
FIG. 1 is a sectional view of a film which can be used in connection with the present invention.

Referring now to the drawings, FIG. 1 illustrates a film 10 from which bags suitable for use in packaging food products can be formed. The film 10 has a layer 12 comprising cross-linked polymeric material. This can be any suitable polymer, especially an alpha-olefin containing material. Suitable polymeric materials include but are not limited to ethylene/alpha olefin copolymer (EAO), ethylene/acrylic acid copolymer (EAA), ethylene/methacrylic acid copolymer (EMAA), ethylene/methyl acrylate copolymer (EMA), ethylene/n-butyl acrylate copolymer (EnBA), ethylene/methyl methacrylate copolymer (EMMA), ethylene/vinyl acetate copolymer (EVA), and blends of these materials with each other or with other polymers and/or copolymers. The layer 12 may have a thickness of from about 0.5 to about 5.0 mils, and preferably has been irradiated to a dosage of 1 to 250 megarads.

Film 10 also has a layer 14 which is preferably used as a heat sealable layer of a bag made in accordance with the present invention. The layer 14 may be formed from any of the materials described above with regard to layer 12, and may have a thickness of from about 0.1 to about 4.0 mils. The layer 14 is non-crosslinked, or alternatively is crosslinked but to a lesser extent than the material of layer 12.

Film 10 can also include an optional layer 16. The layer 16 can have a thickness of between 0.05 and 2 mils, and can be formed of any suitable polymer. Especially preferred are polymeric materials with low oxygen transmission, such as vinylidene dichloride/methyl acrylate copolymer, vinylidene dichloride/vinyl chloride copolymer, and vinyl alcohol/ethylene copolymer.

Additional layers can be added as required by the particular application and final film product. The additional layers can include, for example, an abuse resistant layer, an oxygen scavenging layer, a heat sealable layer, a tie (adhesive) layer, and the like.

Particular materials from which the film 10 can be formed and a process for forming the film are set out in U.S. Pat. No. 3,741,253 (Brax et al.). In a typical extrusion coating process, solid polymer beads are fed to a plurality of extruders. Inside the extruders, the polymer beads are forwarded, melted, and degassed, following which the resulting bubble-free melt is forwarded into a die head, and extruded through an annular die, resulting in a continuous tube which is 10–30 mils thick, more preferably 15–25 mils thick.

After cooling or quenching by water spray from a cooling ring, the extruded solidified tube, or tubing, is collapsed by pinch rolls, and is thereafter fed through an irradiation vault surrounded by shielding. The tubing is irradiated with high energy electrons (i.e., ionizing radiation) from an iron core transformer accelerator. The tubing is guided through the irradiation vault on rolls.

After irradiation, the crosslinked tubing is directed through a set of pinch rolls, and then inflated, resulting in a trapped bubble. The tubing is not significantly drawn longitudinally, as the surface speed of a second set of pinch rolls, at the downstream end of the bubble, is about the same at the first set of rolls. The irradiated tubing is inflated only enough to provide a substantially circular tubing without significant transverse orientation, i.e., without stretching.

Slightly inflated, the irradiated first tubing is passed through a vacuum chamber, and thereafter forwarded through a coating die. A second tubular film is melt extruded from the coating die onto the slightly inflated, irradiated first tube, to form a second tubular film. The second tubular film preferably comprises an $O_2$ barrier layer (e.g. vinylidene dichloride/methyl acrylate copolymer), which does not pass through ionizing radiation.

After irradiation of the first tube and coating the second tubular film, additional layers are applied annularly as required.

If a solid state oriented, heat shrinkable film is desired, the multilayer tubular film may be passed over a guide roll and submersed in a hot water bath for a time period in order to bring the film up to the desired temperature for biaxial orientation. Thereafter, the irradiated tubular film may be directed through nip rolls, and a bubble blown, thereby transversely stretching and longitudinally drawing the film.

Figure 2:
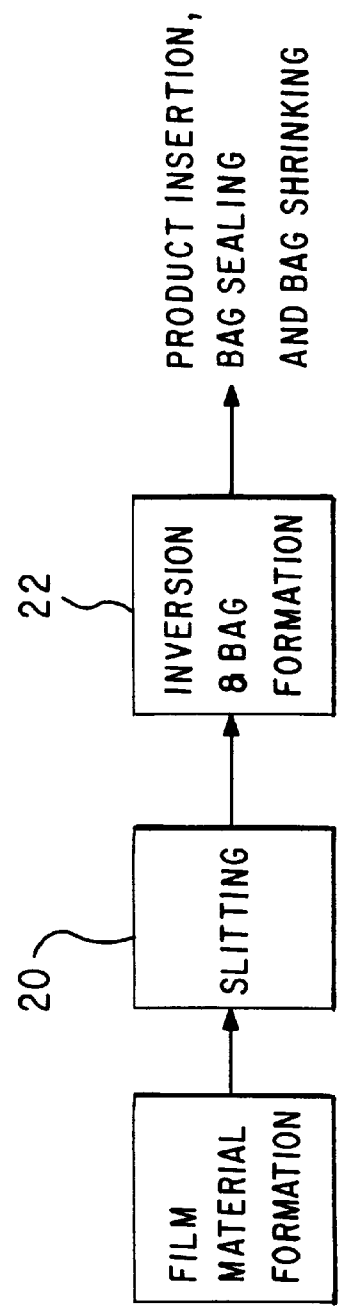
FIG. 2 is a schematic representation of the process steps of the present invention.
Figure 3:
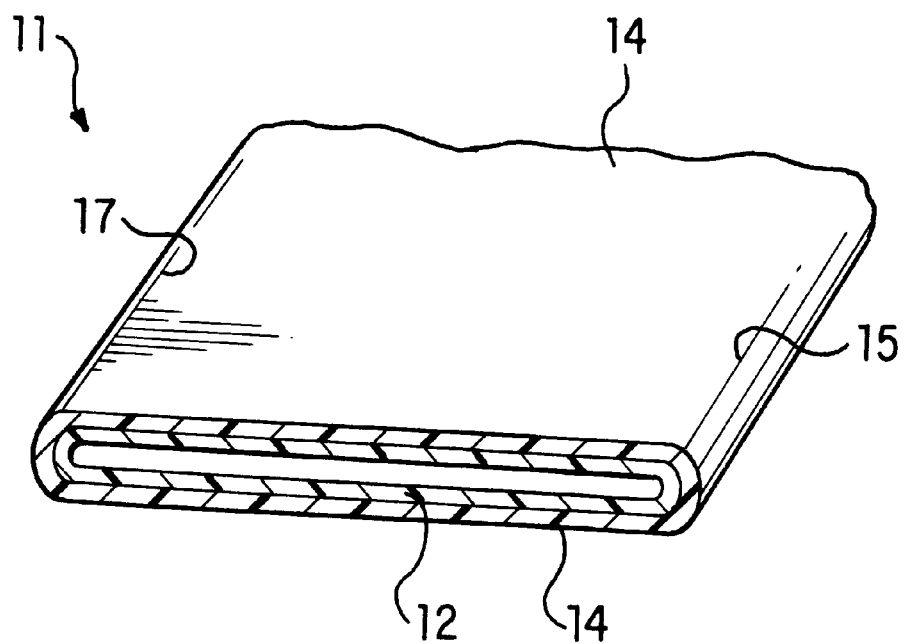
FIG. 3 is a perspective view of a tubular film useful in connection with the present invention.

FIG. 2 is a schematic representation of the method of the present invention. As shown therein, the film is first formed, using any suitable process, e.g. such as described in the Brax et al. patent. The result is a tubular layflat film 11 (see FIG. 3) having lateral folded edges 15 and 17. Crosslinked annular layer 12 forms an innermost layer in the layflat tubular film. Non-crosslinked layer 14 forms an outermost layer in the layflat tubular film. For the sake of clarity, additional layers such as layer 16 of FIG. 1 have been omitted. It can be seen that a bag made from the layflat tubing of FIG. 3, without further processing, would have a propensity to exhibit the disadvantages discussed herein with respect to sealability, grease resistance, etc.

Figure 4:
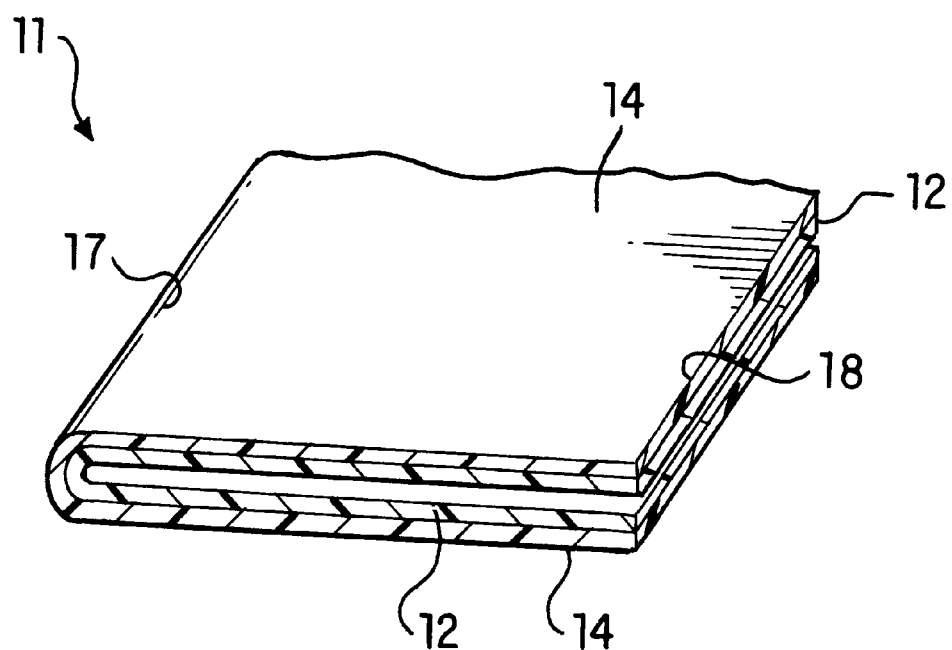
FIG. 4 is a perspective view of a folded film after a longitudinal slitting step.

After the film 10 has been produced with or without the barrier layer 16, it is taken in tube form to a station 20 wherein it is slit along one edge. This slitting operation may be performed by any suitable conventional slitting device known in the art. Slitting can constitute a simple cut in a lateral folded edge of the tubular film, or alternatively can constitute the removal of a portion of the lateral folded edge. With reference to FIG. 4, lateral edge 15 has been longitudinally slit to result in lateral slit edge 18. The tubing is at this point a layflat folded film connected by a lateral folded edge 17 on one side, and open at the other lateral edge 18. Two connected film plies are effectively formed by this process, the lateral folded edge 17, and lateral slit edge 18, defining the lateral extremities of the tube.

Figure 5:
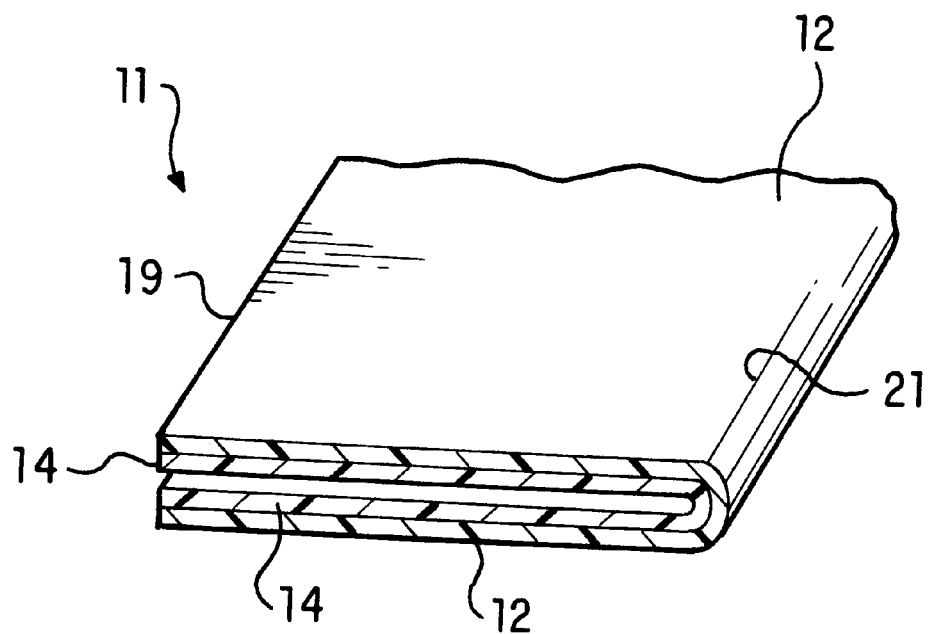
FIG. 5 is a perspective view of the folded film after a reverse centerfolding step.

Referring to FIG. 5, following the slitting operation, the slit centerfold film 11 is then reversed, i.e. inverted, so that the cross-linked layer 12 becomes the external layer of the film, and the non-crosslinked layer 14 becomes the innermost layer of the film in face to face, congruent alignment. The resulting reverse centerfold film can then be sold as is for further processing by third parties, or can be formed into bags into which an article can be inserted. The inversion step thus comprises reverse folding a slit centerfold film. The equipment used to reverse-fold the film can be any conventional reverse folding equipment. As shown in FIGS. 4 and 5, lateral folded edge 17 can be considered a "pivot line" which, after the reverse folding step, becomes lateral folded edge 21.

Alternatively, steps of the process for producing the reverse folded film of this invention may be structured such that the slitting of the multilayer tubular film takes place before both solid state orientation and reverse folding. In this process one would produce the above mentioned irradiated and coated multilayer tubular film, convey the film to a slitting station to open the film to a flat sheet, heat the flat multilayer sheet to bring the sheet to the desired temperature for solid state orientation, and then stretch the film transversely and/or longitudinally to produce a heat shrinkable film. The resulting heat shrinkable multilayer film is then centerfolded such that, as with the earlier described embodiment, the cross-linked layer 12 becomes the external layer of the film, and the non-crosslinked layer 14 becomes the innermost layer of the film in face to face, congruent alignment.

Figure 6:
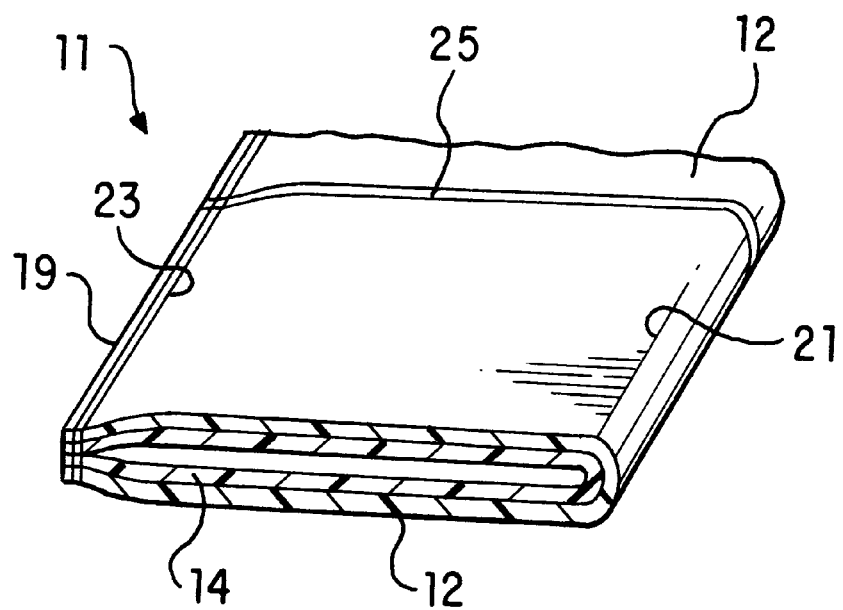
FIG. 6 is a perspective view of the folded film after longitudinal and transverse sealing of the reverse centerfolded folded film.

Referring to FIG. 6, bag forming comprises sealing the lateral slit edge 19 of the reverse-folded centerfold film to create longitudinal seal 23, while creating transverse seals 25 at intervals along the length of the tubing, so as to form a plurality of bags each having an open end through which product can be inserted into the bag. The equipment used to form the bags can be any conventional bag forming equipment known in the art. For the sake of clarity, the transverse seal 25 is shown, but the two film plies are not shown as sealed together in the region of seal 25. Suitable cutting means, not shown, can be used separately or in association with means for making the seals 25, in order to make individual bags from the tubing 11.

Figure 7:
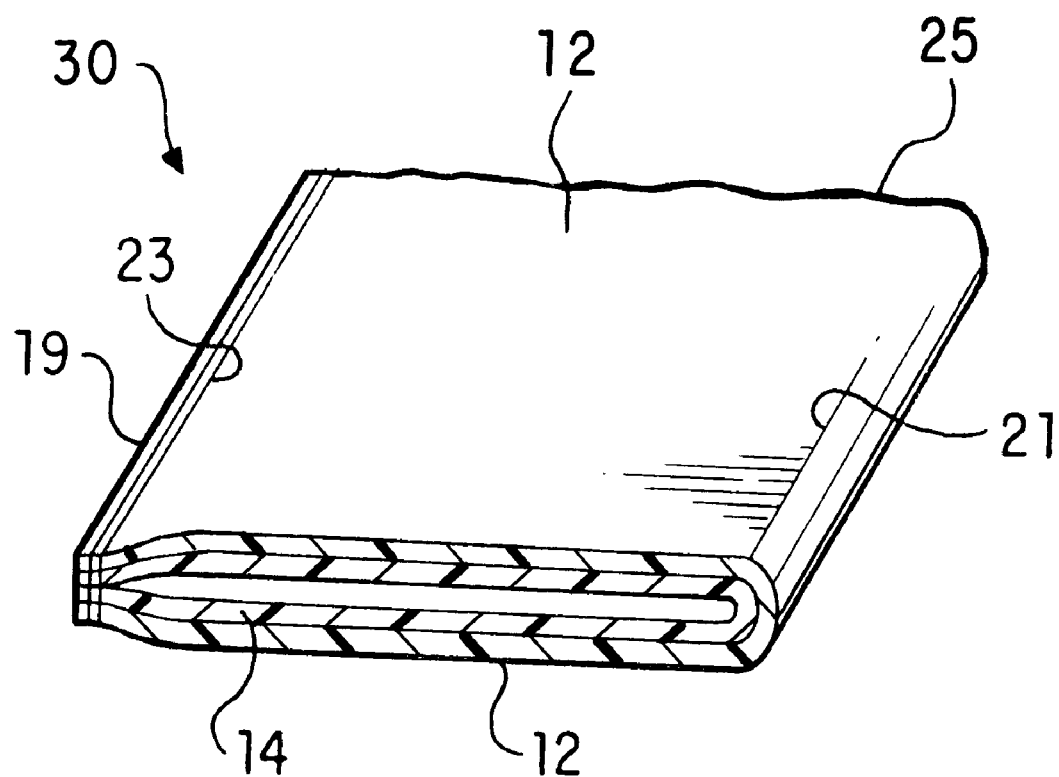
FIG. 7 is a perspective view of a bag made in accordance with the present invention.

Referring to FIG. 7, a bag 30 made from the present inventive process is shown. After a bag has been formed using the present method, an article can be manually inserted into the bag, or mechanically inserted using any suitable conventional article loading machine known in the art. Thereafter, the bag can be evacuated and sealed using any evacuation and sealing techniques known in the art. If the film from which the bag is made has been oriented, heat can be transmitted to the bag, such as by immersing the bag with the article therein in hot water, so as to shrink the bag about the article.

The various steps for forming a bag from the film 10 and for packaging an article within such a bag can be performed in either a continuous or non-continuous manner. For example, the tubular film can be slit and then inverted in-line, and the reverse-centerfold film can be taken up on a wind-up roll for later processing into bags. Alternatively, the tubular film can be slit, inverted, and then made into bags in a continuous process.

The film formed in accordance with the present invention provides improved resistance to grease and improved sealability of the heat sealing layer. It is believed that these significant advantages are achieved because of the presence of the cross-linked layer on the outside of the film or bag.

While the invention has been described in combination with specific embodiments thereof, it is evident that many alternatives will be apparent to those skilled in the art in light of the foregoing description.

Although the invention has been described in the context of an extrusion coating production process, the invention can be beneficially used in conjunction with coextrusion or other film production processes. Additional layers can be added to the substrate and/or coating layers of an extrusion coated film, or to any part of the film structure of a coextruded film, as needed.

What is claimed is:

1. A method comprising:
   a) providing a tubing comprising
      i) an inner annular layer comprising a crosslinked polymeric material, and
      ii) an outer annular layer comprising a non-crosslinked polymeric material;
   b) longitudinally slitting the tubing to form a slit tube; and
   c) reverse centerfolding the slit tube to provide a reverse centerfolded film having a lateral slit edge, and a lateral folded edge opposite said lateral slit edge, such that the inner annular layer becomes an outer layer, and the outer annular layer becomes an inner layer.

2. The method of claim 1 further comprising, between steps a) and c), the step of orienting the tubing.

3. The method of claim 2 comprising longitudinally sealing the lateral slit edge of the reverse centerfolded film, and transversely sealing one end of the reverse centerfolded film to form a bag comprising
   i) an inner layer comprising a non-crosslinked polymeric material, and
   ii) an outer layer comprising a crosslinked polymeric material.

4. The method of claim 3 comprising inserting an article inside the bag.

5. The method of claim 4 comprising sealing an open end of the bag having the article inserted therein, and transmitting heat to said bag to shrink it about said article.

6. The method of claim 1 comprising providing a tubing comprising
   a) an inner annular layer comprising a crosslinked polymeric material,
   b) an outer annular layer comprising a non-crosslinked polymeric material, and
   c) a third annular layer positioned between said inner annular layer and said outer annular layer, said third layer comprising a polymeric material.

7. The method of claim 6 wherein said third layer comprises an oxygen barrier polymeric material.

8. The method of claim 1 wherein the inner annular layer is crosslinked by ionizing irradiation.

9. The method of claim 1 wherein the inner annular layer is chemically crosslinked.

10. The method of claim 1 wherein the step of providing tubing includes the steps of:
    a) melt extruding the inner annular layer;
    b) irradiating the inner annular layer to provide a crosslinked polymeric material; and
    c) extrusion coating the outer annular layer on to the inner annular layer.

11. A method comprising:
a) providing a tubing having
   i) an inner annular layer comprising a crosslinked polymeric material, and
   ii) an outer annular layer comprising a polymeric material crosslinked to a lesser extent than the polymeric material of the inner annular layer;
b) longitudinally slitting the tubing to form a slit tube; and
c) reverse centerfolding the slit tube to provide a reverse centerfolded film having a lateral slit edge, and a lateral folded edge opposite said lateral slit edge, such that the inner annular layer becomes an outer crosslinked layer, and the outer annular layer becomes an inner heat sealable layer.

12. The method of claim 11 further comprising, between steps a) and c), the step of orienting the tubing.

13. The method of claim 12 comprising longitudinally sealing the lateral slit edge of the reverse centerfolded film, and transversely sealing one end of the reverse centerfolded film, to form a bag having
   i) an inner heat sealable layer comprising a polymeric material, and
   ii) an outer crosslinked layer comprising a polymeric material crosslinked to a greater extent than the polymeric material of the inner heat sealable layer.

14. The method of claim 13 comprising inserting an article inside the bag.

15. The method of claim 14 comprising sealing an open end of the bag having the article inserted therein, and transmitting heat to said bag to shrink the bag about said article.

16. The method of claim 11 comprising the step of providing a tubing comprising:
a) an inner annular layer comprising a polymeric material,
b) an outer annular layer comprising a polymeric material crosslinked to a lesser extent than the polymeric material of the inner annular layer, and
c) a third layer positioned between said inner annular layer and said outer annular layer, said third layer comprising a polymeric material.

17. The method of claim 16 wherein said third layer comprises a n oxygen barrier polymeric material.

18. The method of claim 11 wherein the inner annular layer is crosslinked by ionizing irradiation.

19. The method of claim 11 wherein the inner annular layer is chemically crosslinked.

20. The method of claim 11 wherein the step of providing tubing includes the steps of:
a) melt extruding the inner annular layer;
b) irradiating the inner annular layer to provide a crosslinked polymeric material; and
c) extrusion coating the outer annular layer onto the inner annular layer.

* * * * *